United States Patent
Inskeep et al.

(10) Patent No.: US 10,536,015 B2
(45) Date of Patent: *Jan. 14, 2020

(54) PORTABLE POWER TOOL CAPACITOR JUMP START SYSTEM

(71) Applicant: VECTOR PRODUCTS, INC., Boca Raton, FL (US)

(72) Inventors: Mathew Inskeep, Highland Beach, FL (US); Ling To Shum, Boca Raton, FL (US)

(73) Assignee: VECTOR PRODUCTS, INC., Boca Raton, FL (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/440,079

(22) Filed: Feb. 23, 2017

(65) Prior Publication Data

US 2017/0163066 A1      Jun. 8, 2017

Related U.S. Application Data

(63) Continuation-in-part of application No. 14/509,111, filed on Oct. 8, 2014, now Pat. No. 9,673,652.

(Continued)

(51) Int. Cl.
| | |
|---|---|
| *H01M 10/44* | (2006.01) |
| *H01M 10/46* | (2006.01) |
| *H02J 7/00* | (2006.01) |
| *H02J 7/34* | (2006.01) |
| *B60L 53/16* | (2019.01) |
| *B60L 50/40* | (2019.01) |

(Continued)

(52) U.S. Cl.
CPC ............ *H02J 7/0054* (2013.01); *B60L 50/16* (2019.02); *B60L 50/40* (2019.02); *B60L 53/16* (2019.02); *H02J 7/345* (2013.01); *B60L 2210/10* (2013.01); *H02J 2001/006* (2013.01); *H02J 2007/0059* (2013.01); *Y02T 10/70* (2013.01); *Y02T 10/7005* (2013.01); *Y02T 10/7022* (2013.01); *Y02T 10/7072* (2013.01); *Y02T 10/7077* (2013.01); *Y02T 10/7216* (2013.01); *Y02T 90/127* (2013.01); *Y02T 90/14* (2013.01)

(58) Field of Classification Search
CPC ...... H02J 7/0034; H02J 7/0042; H02J 7/0054; H02J 7/355; H02J 7/345
USPC .................. 320/103, 105, 107, 114, 166, 167
See application file for complete search history.

(56) References Cited

U.S. PATENT DOCUMENTS

| | | | |
|---|---|---|---|
| 9,673,652 B2 * | 6/2017 | Inskeep | H02J 7/0054 |
| 2002/0041174 A1 * | 4/2002 | Purkey | F02N 11/14 |
| | | | 320/103 |

(Continued)

*Primary Examiner* — Edward Tso
(74) *Attorney, Agent, or Firm* — Daniel S. Polley, P.A.

(57) ABSTRACT

A fast charging high energy storage capacitor system jump starter is described. The jump starter apparatus incorporates a method of using extracted energy from a battery pack, such as a battery pack used with a portable power tool. The extracted energy is stored at a higher DC potential level by the capacitor system after being boosted or stepped up by a boost/convertor circuit. The stored energy is then available for use in starting a motor vehicle whose vehicle battery as become depleted such that it does not provide enough energy for its intended purposes. The disclosed system and method provide for the motor vehicle battery, combined with a fast charging high energy capacitor bank, to enable the rapid and effective way to jump start a vehicle.

18 Claims, 3 Drawing Sheets

Related U.S. Application Data

(60) Provisional application No. 62/298,523, filed on Feb. 23, 2016, provisional application No. 61/889,082, filed on Oct. 10, 2013.

(51) Int. Cl.
    *B60L 50/16*     (2019.01)
    *H02J 1/00*     (2006.01)

(56) References Cited

U.S. PATENT DOCUMENTS

2003/0011344 A1*   1/2003   Bertness ............... H02J 7/0054
                                                        320/103
2003/0184258 A1*  10/2003   VonderHaar ............ F02N 11/14
                                                        320/103

* cited by examiner

PORTABLE POWER TOOL CAPACITOR JUMP START SYSTEM

This application is a continuation-in-part of U.S. application Ser. No. 14/509,111, filed Oct. 8, 2014, which claims the benefit of and priority to U.S. Provisional Application Ser. No. 61/889,082, filed Oct. 10, 2013. This application also claims the benefit of and priority to U.S. Provisional Patent Application Ser. No. 62/298,523, filed Feb. 23, 2016. All of the above identified applications are incorporated by reference in their entireties for all purposes.

TECHNICAL FIELD

The present disclosure describes a novel portable power tool battery pack coupled with a high-energy capacitor bank to be use as a jump starter assist on a depleted energy system.

BACKGROUND

Power tool battery packs are available and in great demand in the industry of hand held power tools. They are available in various sizes and battery chemistries depending on the manufacturer of the tool. Thus far, battery packs are used in the industry to operate tools such as screwdrivers, impact wrenches, vacuums, blowers etc. Battery packs are used to provide energy to an associated power tool. Presently, power tool battery packs do not have the capability for other uses, such as, but not limited to, safely providing a jump start assist to a depleted automotive battery, because the internal energy and construction it is limited by its design. There exists a need for using the energy inside a battery pack for other purposes, such as, but not limited to, recharging purposes. The present invention is directed to this current need.

SUMMARY OF THE DISCLOSURE

The disclosure describes a novel system and method for e using the energy stored inside a tool battery pack as a source of energy to rapidly charge a capacitor bank. The disclosed system and method differ from the traditional use of a typical tool battery pack and also differ from the traditional use of electrolytic capacitors or that of the like. The novel use of the battery pack and capacitor bank as described herein can be used in one non-limiting embodiment, as a jump start assist system in a motor vehicle or for similar applications.

Though not limiting, the disclosed novel system and method can be preferably targeted for the automotive industry, though other industries may also benefit from use of the disclosed system and method and are also considered within the scope of the disclosure. The disclosed system generally electrically couples a battery pack with a high-energy capacitor bank in order to provide extra energy to assist a depleted motor vehicle battery during an engine starting cycle. The capacitor storage bank preferably can be charged to its optimum energy level by taking some of the energy away from the tool battery pack. In return, the capacitor bank can provide a high jolt of energy to the depleted system in need of a quick boost. In the non-limiting automotive use embodiment, the energy can flow from the portable power tool battery to the capacitor jump start system and then to the motor vehicle's electrical system. The energy can flow via high output power transmission lines and connectors.

DETAILED DESCRIPTION

Figure 1:
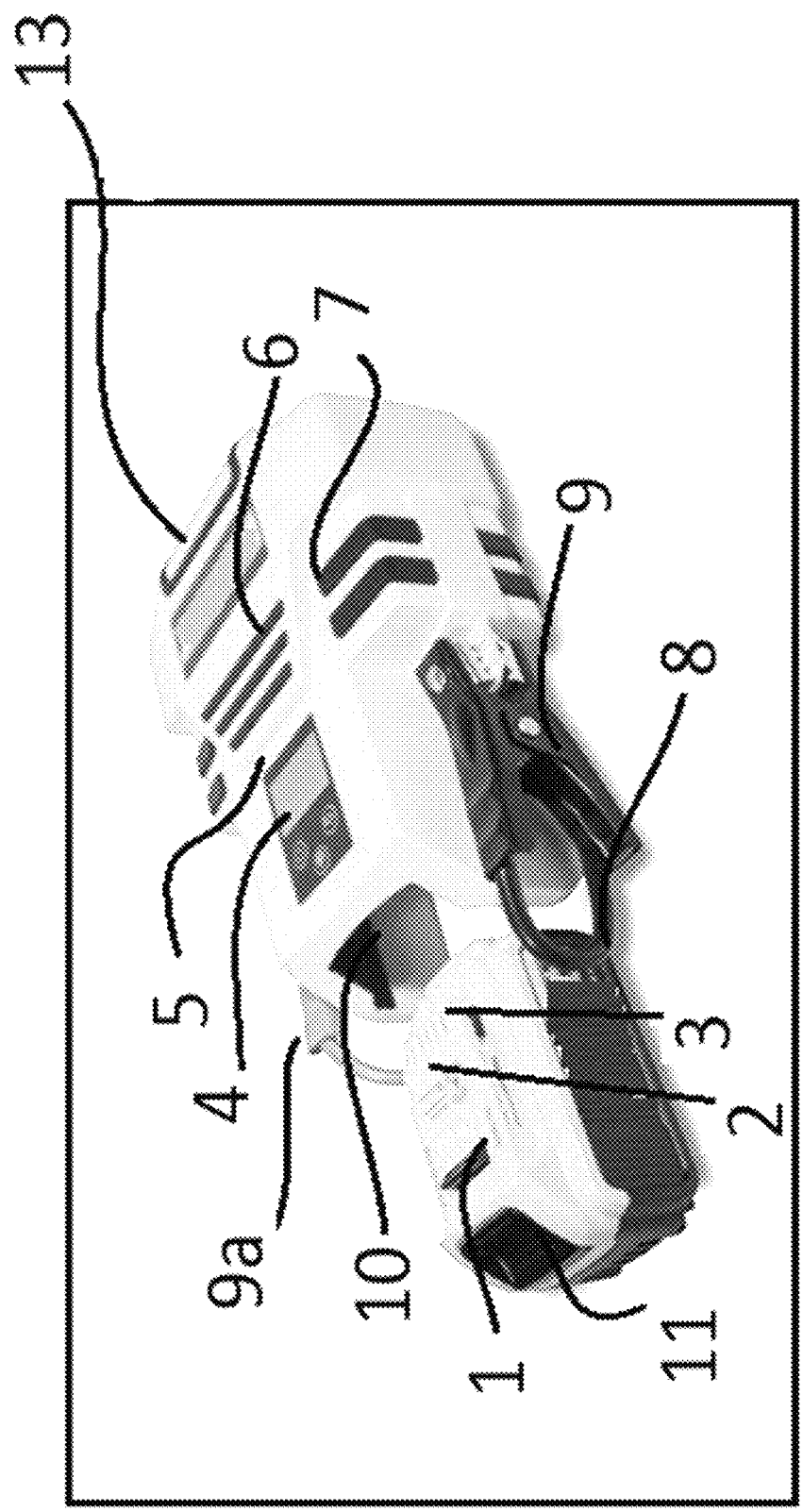
FIG. 1 is a perspective view of one non-limiting embodiment for the main components of the system in accordance with the present disclosure, with it being understood that the type enclosure used is not considered limited to any particular enclosure and may change depending on the type of tool battery pack.

At the outset of use of the disclosed system in connection with a tool battery back, preferably the user verifies that a proper connection has been successfully established between the tool battery pack and the novel system described herein. FIG. 1 is a representation of one non-limiting embodiment for the disclosed system. As seen, a main body enclosure 13 is provided and not considered limited to any particular shape or size. Additionally, as noted above, main body enclosure may change 13, without altering or affecting the electrical characteristic of the described system. Main body enclosure 13 can be constructed so it can accommodate different styles of tool battery pack presently available on the market or later developed. The tool battery pack 1 is provided with one or more, and preferably a plurality of, components that can be mechanically and electrically with the described system of the present disclosure. The tool battery pack 1 preferably can be provided with a mechanical latch 11 for locking and releasing when attaching battery pack 1 to a docking bay 10 of main body enclosure 13, and also for integrating energy transmission lines 2 and 3 for electrical connection Transmission lines 2 and 3 can preferably be the positive and negative voltage potential of battery pack 1.

The voltage and mechanical features for tool battery pack 1 may vary depending on the manufacturer and all variations are considered within the scope of the disclosure. The voltage of the tool battery may also differ by manufacturer and the voltage potential can be lower or higher with reference than that of the capacitor bank 6. The tool battery pack's primary, if not sole, purpose is to contain and deliver sufficient energy to properly charge internal capacitor bank 6 and thus, tool battery pack 1 is not limited any particular type, model or brand.

Figure 2:
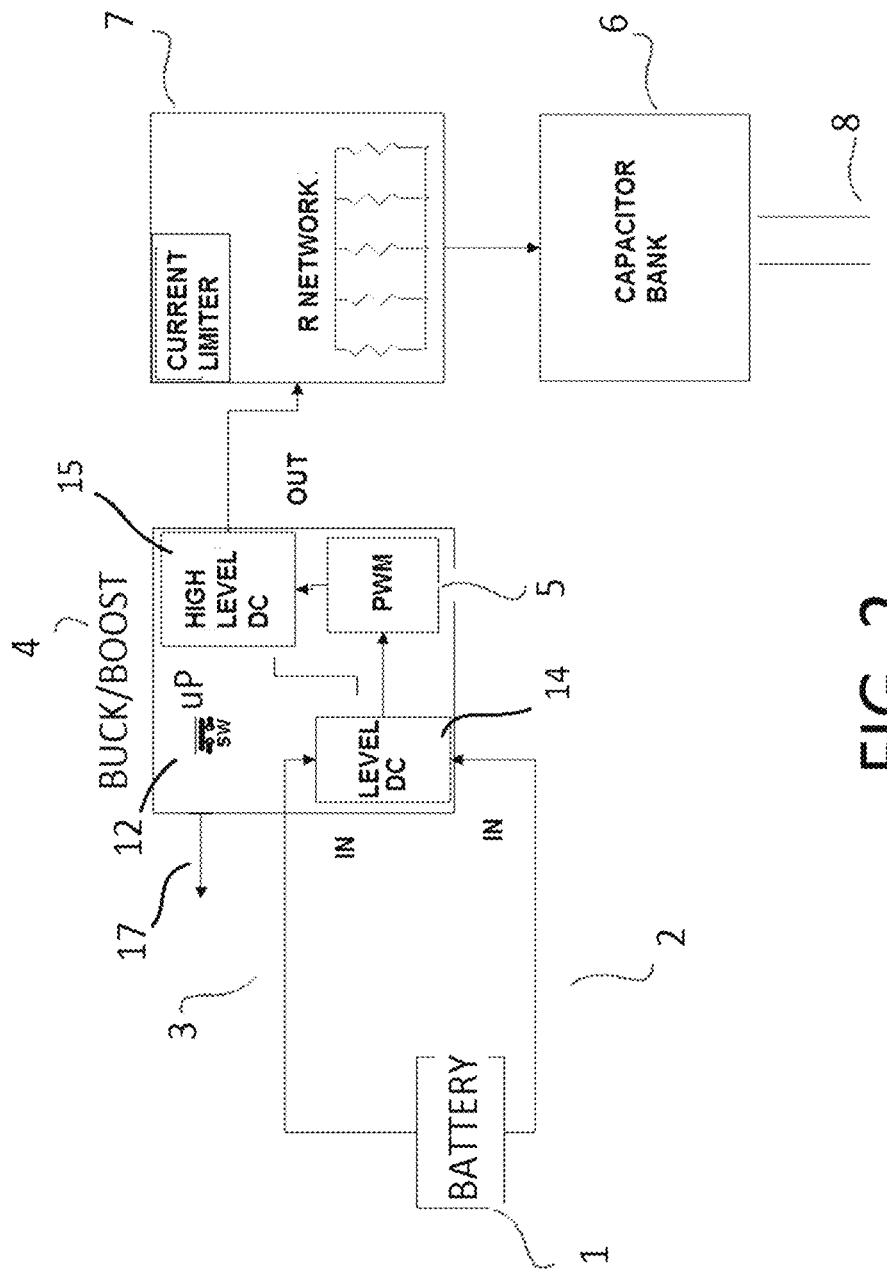
FIG. 2 illustrates an internal electrical connection block diagram for one non-limiting embodiment of the novel system in accordance with the present disclosure and showing the main components of the system.

FIG. 2 depicts a non-limiting high level breakdown of the internal components of the disclosed system and shown in electrical communication with a battery, such as, but not limited battery pack 1. Both transmission lines 2 and 3 from tool battery pack 1 can be fed into a buck/boost circuit 4, which can be a conventional buck/boost circuit currently used in the industry, Buck/boost circuit 4 will also be referred to herein as an up/down converter. The transfer of energy to the up/down converter circuit 4 preferably does not occur until the power switch to a microprocessor 12 is active. Microprocessor 12 can be provided with pre-loaded code to control all the timing sequences of the up/down converter circuit 4. The integrated microprocessor control hardware may include an additional I/O transmission line 17 for control and communication with an output switch device described on FIG. 3. The logic scheme can be a direct activation and deactivation between the capacitor bank and an external load device for the purpose of energy transfer.

Generally, circuit 4 can be made up of a power stage and control circuit, referred to by block 14 and 15, respectfully. Energy from tool battery 1 can be transferred to the buck/boost 4 through the transmission line 1 (ref #2) and line 2 (ref #3). The voltage potential can be received by potential level dc/power stage 14, which depending on the input coming in, can send a signal to the pulse width modulator circuit 5, which then determines how much to control of the voltage and current going out of the high level dc/control circuit 15. Because tool battery pack 1 may have a wide input range, there can be a need to regulate the energy to a desirable voltage that does not exceed the safety levels of an electrically connected capacitor bank 6. Accordingly, the boost circuit can implement a combination of integrated circuit and passive components in order to achieve the desired output of the high level dc/control circuit 15. Essentially, buck/boost circuit 4 draws power from tool battery 1 through transmission lines 2 and 3, which entered/inputted as level dc potential signal and outputted/exits as a high level dc potential signal feeding a current limiter circuit 7. Current limiter circuit 7 can be a time delay circuit that can regulate the timing and restrict the maximum current delivered to capacitor bank 6. The current network can essentially regulate current flow and charging time of capacitor bank 6. The current network is shown in FIG. 2 as a non-limiting resistor network. However, other circuit, electronic, electrical, etc. means can also be used and considered within the scope of the disclosure, including those using metal oxide semiconductors. Conventional buck/boost converter circuits and conventional current limiters can be used for buck/boost converter 4 and current limiter 7 shown in FIG. 2 and used for the disclosed system and method.

Figure 3:
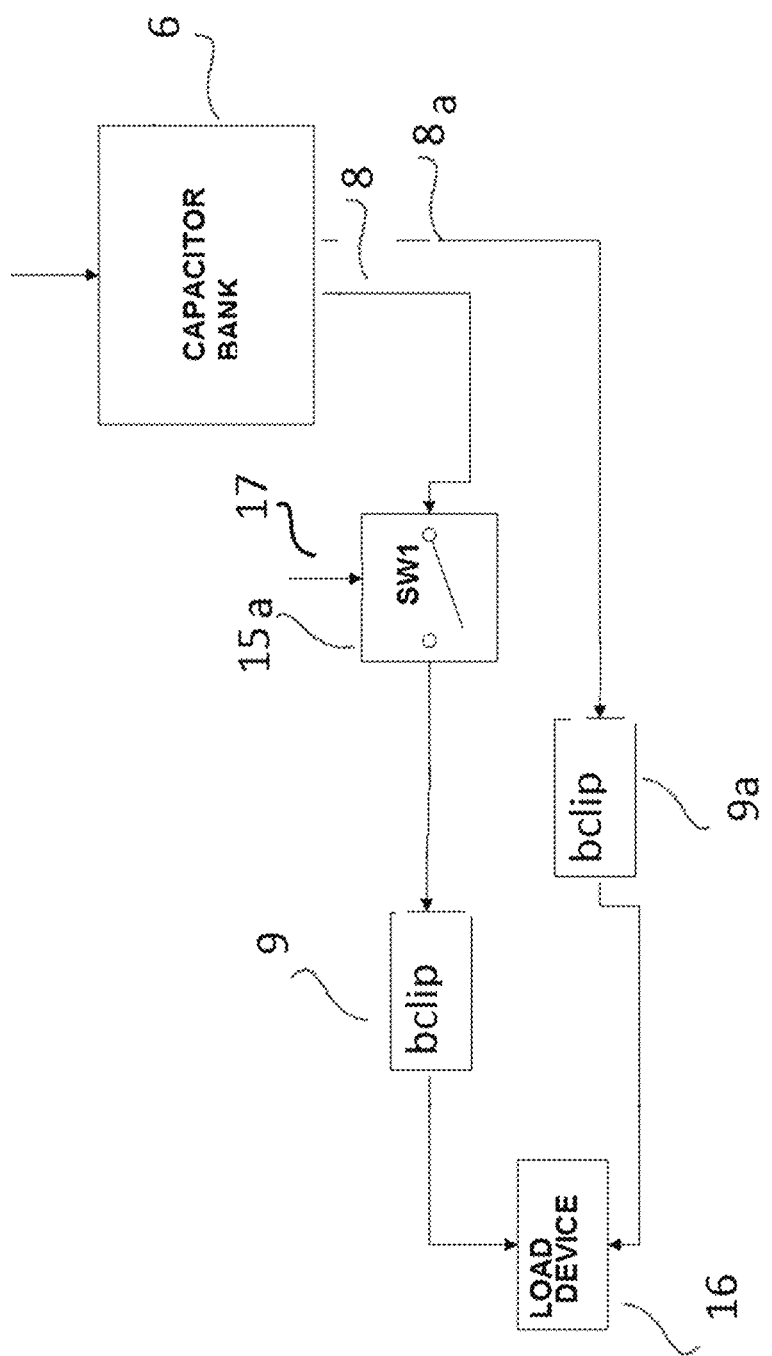
FIG. 3 is a block diagram for one non-limiting output stage of the novel system in accordance with the present disclosure and also illustrating additional components.

FIG. 3 is illustrated a secondary part of the disclosed system, which can be preferably used for transferring energy from capacitor bank 6 onto an external load device 16. The construction of an output switch 15a can be mechanical, electro-mechanical or electronic solid state. If the switch is mechanical a manual activation is allowed, if the switch is either electro-mechanical or electronic, then it can become active when a signal from on board microprocessor 12 (i.e. via I/O transmission line 17, etc.) is sent to output switch device 15a resulting in a circuit closure for the objective of transferring the energy to the load device 16. After, capacitor bank 6 is charged to its optimum level from battery 1 as described in FIG. 2, the energy stored in capacitor bank 6 can be transferred to the load 16 through output transmission lines 8 and 8a. The first transmission line 8 can be connected to a high output switch 15 device which allows the energy transfer via battery clip 9 to load device 16. The secondary transmission line 8a can be electrically connected to the secondary battery clip 9a and load device 16.

Once the energy has been transferred to load device 16 it is available for use in charging or starting another electrical device, such as, but not limited to, assisting a depleted motor vehicle battery during an engine starting cycle.

Non-limiting descriptions for the reference numbers seen in FIG. 1, FIG. 2 and FIG. 3 can include:

| | |
|---|---|
| 1. Tool battery pack body enclosure | 2. Tool battery transmission line 1 |
| 3. Tool battery transmission line 2 | 4. Buck/boost circuit |
| 5. Pulse width modulator | 6. Capacitor bank |
| 7. RC Network | 8. Capacitor output transmission line |
| 8a. Capacitor output transmission line | 9. Battery clip or clamp 1 |
| 9a. Battery clip or clamp 2 | 10. Docking bay |
| 11. Tool battery release lock latch | 12. Microprocessor controls |
| 13. Main body enclosure representation | 14. Power stage |
| 15a Output switch | 16. Load |

Thus, the above disclosure is directed to a new and novel system and method for transferring existing energy of a battery pack, such as those used with power tools, and storing it temporarily inside a supercapacitor bank preferably made up individual supercapacitor cells for the non-limiting purpose of transferring it back to a vehicle installed discharged battery electrical system at a higher energy than received from the battery pack in order to turn over a vehicle's electrical system with a discharged battery. The existing energy of the battery pack is being used and temporarily transferred to the supercapacitor bank. Once the supercapacitor bank is fully charged (i.e. which preferably can be minutes), it can be connected in parallel with a vehicle's installed discharged car battery.

The disclosed device in the above-identified application can transfer on demand the energy from the supercapacitor bank into the vehicle's electrical system on demand. This can be achieved because, unlike a car battery that has high internal resistance and its energy is stored chemically, supercapacitors store their energy electrically and have a significant lower internal resistance than that of a vehicle battery, making it possible to deliver their internal energy instantaneously at a faster rate and at a higher energy for a short period of time. Additionally, when the device is coupled in the parallel circuit configuration with the vehicle's installed car battery, the starting current needed to turn over the engine, is split across each path (parallel circuit) with respect to their internal impedance, making it possible that the combined total energy, become sufficient to turn the engine over via electrical system of a vehicle.

The purpose of the step-up converter described above, is to charge the supercapacitor bank preferably to its maximum voltage potential using a lower voltage source, such as, but not limited to, the battery pack of a power tool, whose voltage may not be sufficient for a cranking current to turn over the engine without additional assistance. This is where the supercapacitor provides the boost.

In one non-limiting embodiment, the supercapacitor bank can be a 58 microfarad bank capable of generating up to 250-300 cranking current preferably for about 1-2 seconds, which when coupled in parallel with the in installed car battery assist in starting the car. As previously stated, the combined total energy (supercapacitor with energy in the battery pack), become sufficient to turn the engine over via electrical system of a vehicle. For larger engines or if larger cranking current is required, the capacitor bank can be doubled without altering the basic functionality of the disclosed novel device.

The boost circuit, when initially connected to the battery pack can start by transferring some of the reserve energy into the capacitor bank at a current rate allowable by the battery pack. In one non-limiting embodiment, the boost circuit can be capable of a charging rate of, but not limited to, six amperes, though other values can be used and are considered within the scope of the disclosure. The boost circuit can also monitor the battery pack against complete depletion, which can be noticeable by the on/off duty cycle curve of the boost circuit. The rate of current varies according to the capacity of the battery pack. The charging rate can be depended of the energy source. The transfer of energy from the battery pack to the capacitor can be considered the first stage.

The battery pack can be electrically coupled with a higher potential unrestricted energy source. Both sources can begin to balance each other with respect to an ideal twelve-volt electrical system. This enables a vehicle's electrical system the capability to utilize both sources as a single energy potential for the purpose of restarting the electrical system (turning over the engine). After a period of time, which in one non-limiting embodiment can be under a minute from connecting both energy sources, the combined output expands the boost capabilities. Connecting the output side of the capacitor bank to the discharged battery can be considered the second stage.

The final stage can be to crank assist start the electrical system of the vehicle with a depleted battery. It's an industry standard that the minimum current and voltage to turn over a standard vehicle engine should have a minimum threshold of 7.2 volt and a minimum current of 200 amps, though such is not considered limiting.

Certain non-limiting features of the above disclosed novel system and method include:
1. A power tool battery pack with a wide nominal voltage coupled with a capacitor bank;
2. A power tool battery pack coupled with a capacitor bank;
3. A power tool battery pack coupled with a capacitor bank, with an integrated up/down converter to accommodate wide input nominal voltage; and
4. A power tool battery pack coupled with a capacitor bank, integrated up/down converter and a high output power switch to provide jump start assist to a depleted system. The high output power switch can be a mechanical, electro-mechanical or electronic solid state device.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described device/system and their locations, electronic communication methods between the system components, wiring, attachment or securement mechanisms, dimensions, values, shapes, materials, etc. discussed above or shown in the drawings, if any, are merely by way of example and are not considered limiting and other component(s) and their locations, electronic communication methods, wiring, attachment or securement mechanisms, dimensions, values, shapes, materials etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the novel system and method have been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A system for aiding in starting of a motor vehicle whose vehicle battery has been depleted to an energy level where the vehicle battery is unusable for an intended purpose of starting the vehicle on its own, said system comprising:
a step up/step down converter circuit adapted for electrical communication with a power tool battery pack and capable of extracting the energy from the power tool battery pack and raising or lowering a DC voltage potential level for the extracted energy depending on a current DC voltage potential level of the power tool battery pack;
a current limiter circuit in electrical communication with an output of the step up/step down converter circuit; and
a single cell or capacitor bank in electrical communication with an output of the current limiter circuit, said single cell or capacitor bank adapted for electrical communication to an electrical load device and when the single cell or capacitor bank is charged the single cell or capacitor bank is capable and available for transferring energy to the load device for use in aiding in starting of a motor vehicle having a depleted motor vehicle battery;
wherein the current limiter circuit restricts a maximum current delivered to the single cell or capacitor bank from the energy extracted from the power tool battery pack and regulates a charging time for the single cell or capacitor bank using the energy extracted from the power tool battery pack.

2. The system for aiding of claim 1 wherein the step up/step down converter circuit including a high frequency pulse width modulator.

3. The system for aiding of claim 1 further comprising a high power switch in electrical communication with an output line of the single cell or capacitor bank, wherein the charged single cell or capacitor bank is permitted to transfer energy to the load device when the switch is closed.

4. The system for aiding of claim 1 wherein the load device is a dead battery of a motor vehicle.

5. The system for aiding of claim 1 wherein the step up/step down converter circuit in electrical communication with the power tool battery pack through a pair of transmission lines.

6. The system for aiding of claim 1 wherein the load device is in electrical communication with the single cell or capacitor bank through a pair of output transmission lines and a pair of clips, a first of the pair of clips connected to a first of the pair of output transmission lines and a second of the pair of clips connected to a second of the pair of output transmission lines.

7. The system for aiding of claim 6 further comprising a switch disposed between and in electrical communication with the single cell or capacitor bank, wherein the charged single cell or capacitor bank is permitted to transfer energy to the load device or assist in starting a motor vehicle having a depleted battery when the switch is closed.

8. The system for aiding of claim 1 wherein the power tool battery pack is of a type of battery pack used to power a portable power tool.

9. A method for obtaining electrical energy from a battery pack power source for using the obtained energy in aiding in starting of a motor vehicle whose vehicle battery has been depleted to an energy level where the vehicle battery is unusable for an intended purpose of starting the vehicle on its own, said method comprising the steps of:
 (a) extracting at least a portion of the energy from a battery pack;
 (b) stepping up or stepping down a DC voltage potential level for the extracted energy depending on a current DC voltage potential level of the extracted energy from the battery pack; and
 (c) charging a single cell or capacitor bank using the stepped up or stepped down extracted energy.

10. The method for obtaining of claim 9 further comprising the step of using electrical energy stored in the charged single cell or capacitor bank to assist in turning over an engine of a motor vehicle whose vehicle battery is depleted to a point where it cannot turn over the engine on its own.

11. The method for obtaining of claim 9 further comprising the step of regulating a timing of using the stepped up or stepped down extracted energy when charging the single cell or capacitor bank in step (c).

12. The method for obtaining of claim 9 further comprising the step of restricting an amount of current that is provided when charging the single cell or capacitor bank in step (c).

13. The method for obtaining of claim 9 further comprising the steps of regulating a timing of using the stepped up or stepped down extracted energy and restricting an amount of current that is provided by a current limiter circuit when charging the single cell or capacitor bank in step (c).

14. The method for obtaining of claim 10 further comprising the step of closing a switch in electrical communication with an output line of the single cell or capacitor bank prior to transferring energy to the load device from the electrical energy stored by the single cell or capacitor bank.

15. A method for aiding in starting of a motor vehicle whose vehicle battery has been depleted to an energy level where the vehicle battery is unusable for an intended purpose of starting the vehicle on its own, said method comprising the steps of:
 (a) extracting at least a portion of the energy from a battery pack;
 (b) stepping up or stepping down a DC voltage potential level for the extracted energy depending on a current DC voltage potential level of the extracted energy from the battery pack using a step up/step down converter circuit directly or indirectly electrically connected to the battery pack;
 (c) regulating a timing of supplying the stepped up or stepped down extracted energy and restricting an amount of current that is provided to a single cell or capacitor bank by a current limiter circuit that is in electrical communication with the single cell or capacitor bank;
 (d) charging a single cell or capacitor bank using the extracted energy supplied by the current limiter circuit;
 (e) closing a switch in electrical communication with an output line of the single cell or capacitor bank in order to provide electrical communication between the single cell or capacitor bank and a load device; and
 (f) using electrical energy stored in the charged single cell or capacitor bank to assist in turning over an engine of a motor vehicle whose vehicle battery is depleted to a point where it cannot turn over the engine on its own or to charge a previously depleted vehicle battery to a level where the vehicle battery is capable of being used for the intended purpose of the battery.

16. The method for charging a battery of claim 15 wherein the battery pack is of a type of battery pack used to power a portable power tool.

17. A system for aiding in starting of a motor vehicle whose vehicle battery has been depleted to an energy level where the vehicle battery is unusable for an intended purpose of starting the vehicle on its own, said system comprising:
 a step down converter circuit adapted for electrical communication with a battery pack and capable of extracting at least some of the energy from the battery pack and lowering a DC voltage potential level for the energy extracted;
 a current limiter circuit in electrical communication with an output of the step down converter circuit; and
 a single cell or capacitor bank in electrical communication with an output of the current limiter circuit, said single cell or capacitor bank adapted for electrical communication to an electrical load device and when the single cell or capacitor bank is charged the single cell or capacitor bank is capable and available for transferring energy to the load device for use in aiding in starting of a motor vehicle having a depleted motor vehicle battery;
 wherein the current limiter circuit restricts a maximum current delivered to the single cell or capacitor bank from the energy extracted from the battery pack and regulates a charging time for the single cell or capacitor bank using the energy extracted from the battery pack.

18. A system for aiding in starting of a motor vehicle whose vehicle battery has been depleted to an energy level where the vehicle battery is unusable for an intended purpose of starting the vehicle on its own, said system comprising:
 a step up converter circuit adapted for electrical communication with a battery pack and capable of extracting at least some of the energy from the battery pack and raising a DC voltage potential level for the extracted energy;
 a current limiter circuit in electrical communication with an output of the step up converter circuit; and
 a single cell or capacitor bank in electrical communication with an output of the current limiter circuit, said single cell or capacitor bank adapted for electrical communication to an electrical load device and when the single cell or capacitor bank is charged the single cell or capacitor bank is capable and available for transferring energy to the load device for use in aiding in starting of a motor vehicle having a depleted motor vehicle battery;

wherein the current limiter circuit restricts a maximum current delivered to the single cell or capacitor bank from the energy extracted from the battery pack and regulates a charging time for the single cell or capacitor bank using the energy extracted from the battery pack.

* * * * *